(12) United States Patent
Rawlins et al.

(10) Patent No.: US 7,140,854 B2
(45) Date of Patent: *Nov. 28, 2006

(54) APPARATUS FOR AND METHODS OF DAMAGE REPAIR

(75) Inventors: Philip Rawlins, Chesterton (GB); Douglas Scott MacArthur, Herts (GB); Robert Ian Lister, Dromfield (GB); Graham Scott Gutsell, Hartson (GB)

(73) Assignee: Carglass Luxembourg S.a.r.l.-Zug Branch (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/235,918

(22) Filed: Sep. 27, 2005

(65) Prior Publication Data

US 2006/0024398 A1 Feb. 2, 2006

Related U.S. Application Data

(63) Continuation of application No. 10/456,042, filed on Jun. 6, 2003, now Pat. No. 7,029,255, which is a continuation of application No. 09/709,180, filed on Nov. 9, 2000, now Pat. No. 6,589,036.

(30) Foreign Application Priority Data

Nov. 12, 1999 (GB) .................................. 9926864.1

(51) Int. Cl.
*B29C 35/00* (2006.01)

(52) U.S. Cl. .................. 425/12; 264/36.21; 264/36.22; 425/13

(58) Field of Classification Search .................. 425/11, 425/12, 13; 264/36.1, 36.18, 36.21, 36.22

See application file for complete search history.

(56) References Cited

U.S. PATENT DOCUMENTS

| 3,562,366 | A | 2/1971 | Sohl ........................... 204/443 |
| 4,047,863 | A | 9/1977 | McCluskey et al. .......... 425/13 |
| 4,200,478 | A | 4/1980 | Jacino et al. ................. 156/94 |
| 4,280,861 | A | 7/1981 | Schwartz ................. 264/36.21 |
| 4,385,015 | A | 5/1983 | Klettke ........................ 425/12 |
| 4,776,780 | A | 10/1988 | Banks ......................... 425/12 |
| 4,820,148 | A | 4/1989 | Anderson .................... 425/12 |
| 4,826,413 | A | 5/1989 | Matles ........................ 425/12 |
| 4,919,602 | A | 4/1990 | Janszen ....................... 425/12 |
| 4,919,603 | A | 4/1990 | Herold et al. ................. 425/12 |

(Continued)

FOREIGN PATENT DOCUMENTS

CL 40168 4/1997

(Continued)

*Primary Examiner*—Joseph S. Del Sole
*Assistant Examiner*—Emmanuel S. Luk
(74) *Attorney, Agent, or Firm*—Hoffmann & Baron, LLP

(57) ABSTRACT

Apparatus is disclosed for repairing a flaw in a surface, particularly in the field of vehicle glass repair. The apparatus has a housing adapted to engage the surface to be repaired, a repair seal for sealing between the housing and around the flaw to be repaired to define a repair space over the flaw. A reservoir communicates with the repair space and, in use, contains liquid repair material. A vacuum pump communicates with the repair space and the reservoir to apply a partial vacuum to the repair space and to the reservoir without repair liquid from the reservoir being drawn into the repair space in order to degas separately the flaw and repair liquid in the reservoir. After appropriate degassing, repair liquid from the reservoir is caused to flow into the repair space to fill the repair space with repair liquid.

19 Claims, 10 Drawing Sheets

U.S. PATENT DOCUMENTS

| | | |
|---|---|---|
| 4,919,986 A | 4/1990 | Lay et al. ..................... 428/43 |
| 4,954,300 A | 9/1990 | Dotson .................... 264/36.21 |
| 4,975,037 A | 12/1990 | Freiheit ....................... 425/12 |
| 5,156,853 A | 10/1992 | Werner et al. ................ 425/12 |
| 5,209,935 A | 5/1993 | Jacino et al. ................. 425/12 |
| 5,591,460 A | 1/1997 | Wanstrath et al. ............ 425/12 |
| 5,622,726 A | 4/1997 | Tanner ........................ 425/12 |
| 5,698,053 A | 12/1997 | Carroll et al. ............... 156/103 |
| 5,837,294 A | 11/1998 | Shrimpton ................... 425/12 |
| 5,897,882 A | 4/1999 | Gonzalez ..................... 425/12 |
| 6,338,619 B1 | 1/2002 | Rusch ......................... 425/12 |

FOREIGN PATENT DOCUMENTS

| | | |
|---|---|---|
| CL | 727-97 | 10/1998 |
| WO | WO 97/39879 | 10/1997 |

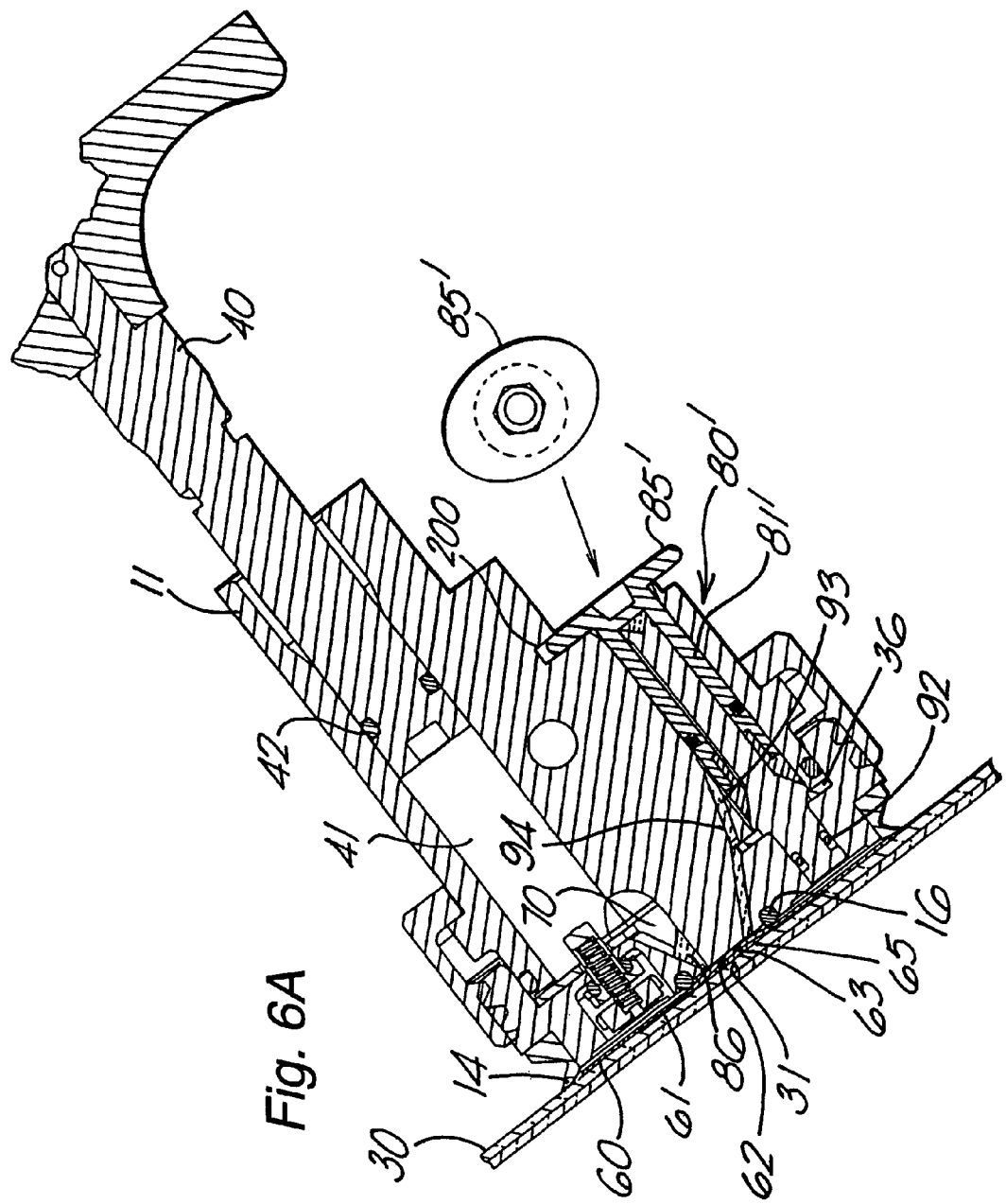

APPARATUS FOR AND METHODS OF DAMAGE REPAIR

CROSS-REFERENCE RELATED APPLICATIONS

This application is a continuation of U.S. patent application Ser. No. 10/456,042, filed Jun. 6, 2003, now U.S. Pat. No. 7,029,255, which is a continuation of U.S. patent application Ser. No. 09/709,180, filed Nov. 9, 2000, now U.S. Pat. No. 6,589,036, which claims the benefit of International Application No. GB9926864.1, filed Nov. 12, 1999, the contents of all of which are incorporated herein by reference.

FIELD OF THE INVENTION

The invention relates to apparatus for and methods of damage repair, more particularly but not exclusively in the field of repair of vehicle glass which is frequently chipped by flying stones or other material. The term "flaw" used herein is to cover chips defects or other surface faults.

BACKGROUND OF THE INVENTION

Existing apparatus and methods for repair of damaged vehicle glass involve subjecting a space around the area of damage to a partial vacuum to allow satisfactory penetration of an optically compatible resin into the area of damage, and extraction of air from the resin itself, curing the resin once the damaged area has been filled, and finishing the repair by removing excess cured resin and polishing the surface of the previously damaged area.

Problems which arise concern adequate degassing of both the damaged area and the resin. For example, the apparatus described in U.S. Pat. Nos. 4,4193,005 and 4,385,015 has a suction cup connected to a vacuum pump. A tube extends through the suction cup and seals against the surface of the glass around the flaw to be repaired. The inside of the tube communicates through a radial vacuum port with the space inside the suction cup. Resin is introduced into the tube and a piston is then introduced into the tube, at which time the vacuum pump acts on the flaw and the resin in the flaw to degas both the resin and the flaw. De-gasification in this way needs more time and is less effective, since gas from the flaw has to leave through the resin.

U.S. Pat. No. 4,776,780 describes a hand-operated suction cup through which a passage is provided for receiving repair liquid, such as a curable resin. The passage seals against the surface of the glass when a vacuum is applied to the suction cup, and the passage is completely isolated then from the suction cup interior. Resin is introduced into the passage and a piston is moved up and down in the passage to evacuate or pressurising the space within the passage. This apparatus encounters similar degassing problems described above.

SUMMARY OF THE INVENTION

According to one aspect of the invention, there is provided apparatus for repairing a flaw in a surface, which apparatus comprises:

a housing adapted to engage the surface, a repair seal for sealing between the housing and around the flaw to be repaired to define between the surface and the housing a repair space over the flaw, a reservoir communicating with the repair space for containing liquid repair material, vacuum means communicating with the repair space and the reservoir to apply a partial vacuum to the repair space and to the reservoir without repair liquid from the reservoir being drawn into the repair space in order to degas separately the flow and repair liquid in the reservoir, and means for causing repair liquid, in use, to flow from the reservoir into the repair space to fill the repair space with repair liquid.

The apparatus preferably includes means for exerting pressure on the repair space.

The invention further provides apparatus for repairing a flaw in a surface, which apparatus comprises:

a housing adapted to engage the surface, a repair seal for sealing between the housing and around the flaw to be repaired to define between the surface and the housing a repair space over the flaw, first vacuum means communicating with the repair space for applying a partial vacuum to the repair space, second vacuum means for applying an enhanced vacuum to the repair space, and a reservoir for supplying repair liquid to the repair space.

The second vacuum means preferably comprises a piston slidably located in a bore in the housing, which bore communicates with the repair space.

The piston is preferably movable between a first position in which the partial vacuum applied by the vacuum means exists in the repair space and a second position in which the enhanced vacuum is applied to the repair space.

Valve means are preferably located in the housing between the first vacuum means and the second vacuum means such that when the second vacuum means is in use, the first vacuum means is isolated from the repair space.

The piston is preferably movable to a third position in which the bore and repair space are returned to external pressure, movement of the piston back towards the first position thereby exerting pressure on the repair space.

The piston positions are preferably defined by a cam extending from one of the piston and the bore wall, and a groove in the other of the piston and the bore wall to control piston travel within the bore.

The housing preferably includes an outer seal, the outer seal and the repair seal defining an annular space between the housing and the surface in use, the annular space having a connection to a vacuum source for reducing the pressure in the annular space to hold the housing to the surface in use.

The invention further provides a flexible patch for use with apparatus for repairing a flaw in a surface, which apparatus is of the type in which liquid repair material is introduced into a partly evacuated repair space adjacent the flaw, the patch being of gas and liquid impermeable sheet material and having a ring of adhesive on one side thereof for adhering to the surface around the flaw to be repaired, the patch including at least one slit therein within the ring of adhesive to allow liquid and gas to pass through the slit or each slit.

The patch preferably has two slits.

The adhesive ring is preferably of a thickness greater than 200 microns extending proud of the patch surface. A preferred adhesive ring thickness is 350 microns.

The invention further provides apparatus for repairing a flaw in a surface comprising a housing adapted to engage the surface, a repair seal for sealing between the housing and around the flaw to be repaired to define between the housing and the surface a repair space over the flaw, vacuum means communicating with the repair space for applying a partial vacuum to the repair space and a reservoir for supplying liquid repair material to the repair space, the reservoir comprising a capsule containing liquid repair material and a capsule holder in the housing, the capsule holder communicating with the repair space and including a release element for releasing liquid repair material from the capsule into the capsule holder when the capsule is inserted into the capsule holder.

The capsule is preferably cylindrical and includes an annular seal extending around the cylindrical outer surface thereof intermediate the ends of the capsule to form a seal with the interior surface of the capsule holder in the housing.

The capsule preferably includes an internal membrane to retain liquid repair material in the capsule, and the release element is preferably a spike to break the membrane when the capsule is inserted in the capsule holder.

When the liquid repair material is first released from the capsule into the capsule holder, the volume of the capsule holder is preferably sufficient to contain the liquid repair material without any liquid repair material reaching the repair space.

Upon full insertion of the capsule into the capsule holder, the repair space is preferably filled with liquid repair material.

The apparatus preferably includes a capsule position locating element on the housing for locating the capsule in a first position in which the liquid repair material is released and retained in the capsule holder or a second position in which the capsule is retained in a fully inserted position. The capsule preferably has a flange at the end thereof away from the end for insertion with the capsule holder, and the capsule position locating element is preferably an element spring biased to engage the flange to prevent movement of the capsule beyond the first position until moved inwardly, and engageable with the flange to prevent removal of the capsule when fully inserted, until moved inwardly towards the housing.

The invention further provides a method of repairing a flaw in a surface comprising the steps of forming a repair space adjacent the flaw;

applying a vacuum to the repair space and to liquid repair material while the liquid repair material is held outside the repair space;

introducing the liquid repair material into the repair space;

removing the vacuum applied to the repair space and then pressurising the repair space;

removing the repair space;

curing the liquid repair material until hard, and smoothing the repaired surface.

There is preferably an initial step of securing a patch over the flaw, the patch having a ring of adhesive surrounding the flaw, before forming the repair space, the patch being removed after curing the liquid repair material.

By way of example, one embodiment of apparatus and a method for repairing a flaw in a surface, together with an embodiment of a patch, according to the invention will now be described with reference to the accompanying drawings, in which:

BRIEF DESCRIPTION OF THE DRAWINGS

FIG. 6A shows, in a view and position corresponding to FIG. 6, an alternative arrangement for retaining a capsule in its associated reservoir.

DETAILED DESCRIPTION OF THE PRESENT INVENTION

Figure 1:
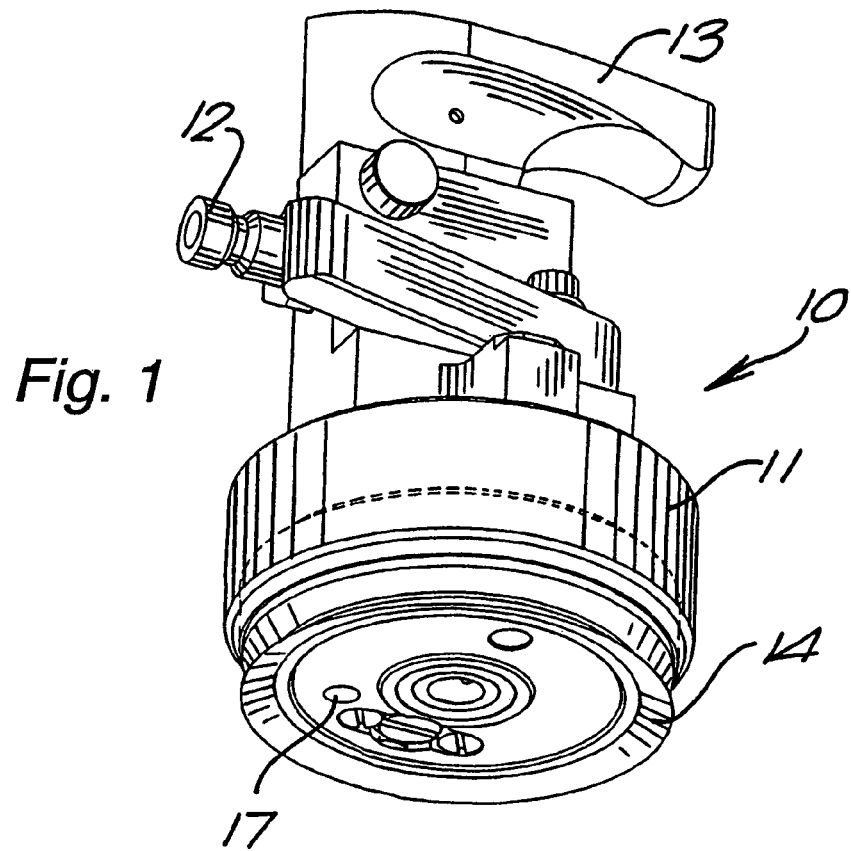
FIG. 1 is a perspective view of apparatus for repairing a flaw.

Apparatus for repairing a flaw in a surface is shown at 10 in FIG. 1. The apparatus 10 is designed primarily for repairing flaws such as cracks or chips in glass, notably vehicle windscreens which are often subjected to impact from stones or other debris.

Apparatus 10 has a housing 11 machined from a solid block of polymeric material suitable for machining. The shape of the housing 11 is such that it would be convenient to machine housing out of round stock of machineable polymeric material.

Internal features of the housing 11 will be described in more detail later but FIG. 1 shows a port 12 for connection to a vacuum pump, a handle 13 attached to a piston (described later) moveable up and down in a bore in the housing 11 and features at the base of the housing 11, shown in more detail in FIG. 2.

The base includes a peripheral elastomeric seal 14, a poppet valve assembly 15 an O-ring seal 16 to form a seal around the flaw to be repaired and an opening 17 connected to the vacuum port 12 through a bore in the housing. The feature shown at 18 is a base portion of part of a resin capsule holder to be described later. The poppet valve assembly 15 is held in place by a pair of screws 19; base support 20 has cutouts 21 and 22 so that, when rotated through 90°, the poppet valve assembly can be removed completely from the housing for cleaning.

Figure 3:
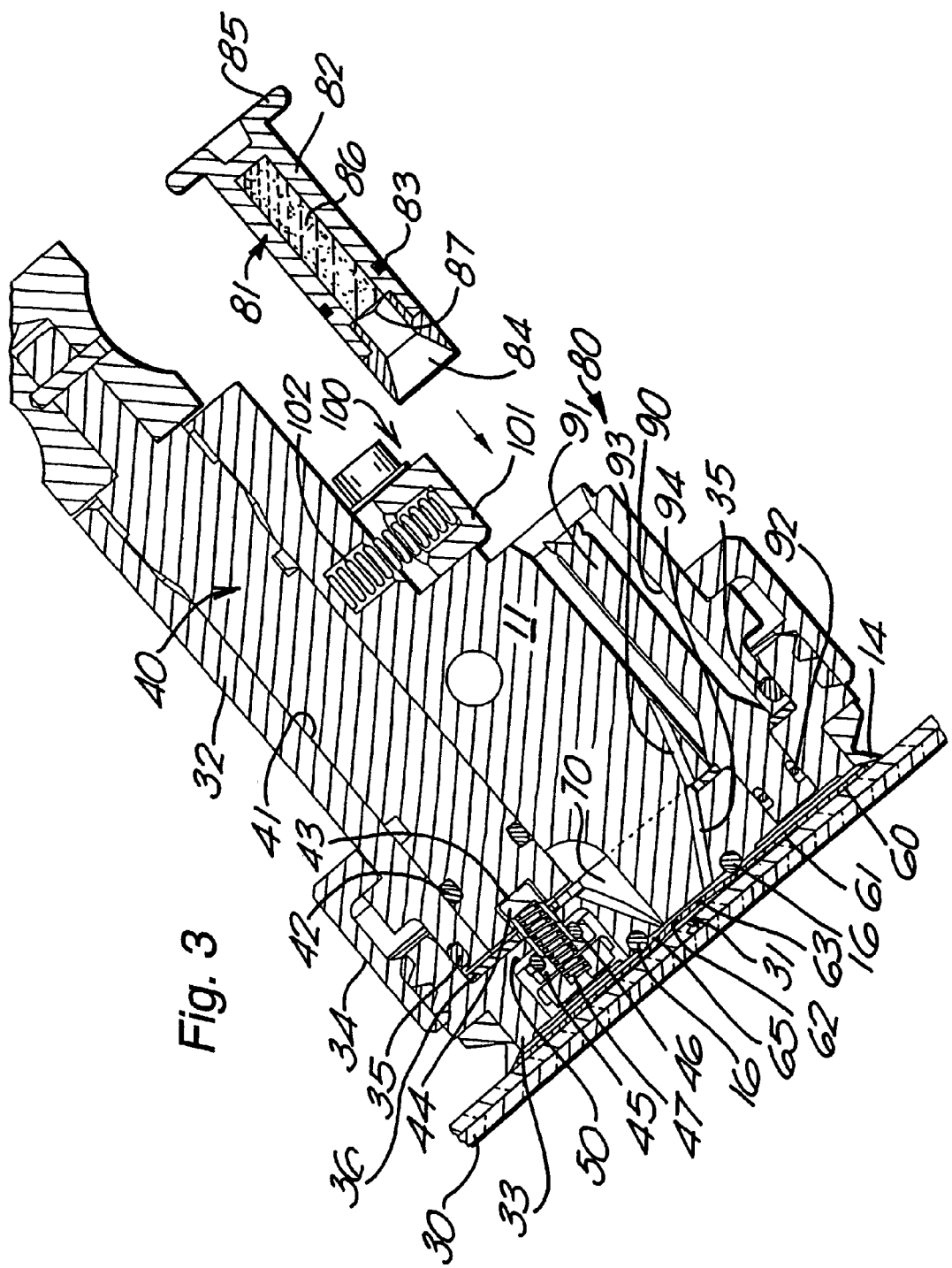
FIG. 3 is a sectional view of the apparatus of FIGS. 1 and 2 before commencement of a repair sequence.

FIG. 3 shows the apparatus 10 held by suction against laminated glass sheet 30 having a flaw 31 in it to be filled and repaired. The housing 11 is formed in two parts 32, 33 held together by a threadedly engaged retaining ring 34 and sealed by a gasket 36. An O-ring seal 35 seals between the two housing parts 33 and 34 a piston 40 is moveable within a cylindrical bore 41 in the housing 11. An O-ring 42 located near the base of the piston 40 seals between the piston 40 and the bore 41. The piston 40 has a recess 43 at the base thereof designed to accept a top portion 44 of the poppet valve assembly 15. The poppet valve assembly 15 has an annular portion 45 locating O-ring 46 which is biased by spring 47 to seal against valve seat 50. When the piston 40 is fully down, the piston forces down the poppet valve to unseat the O-ring 46 to open the valve.

The housing is held in place by application of a partial vacuum from a vacuum pump (not shown) acting through the opening 17 in the annular space between the O-ring 16 and the seal 14. The housing is held against the glass 30 in this way.

Figure 9:
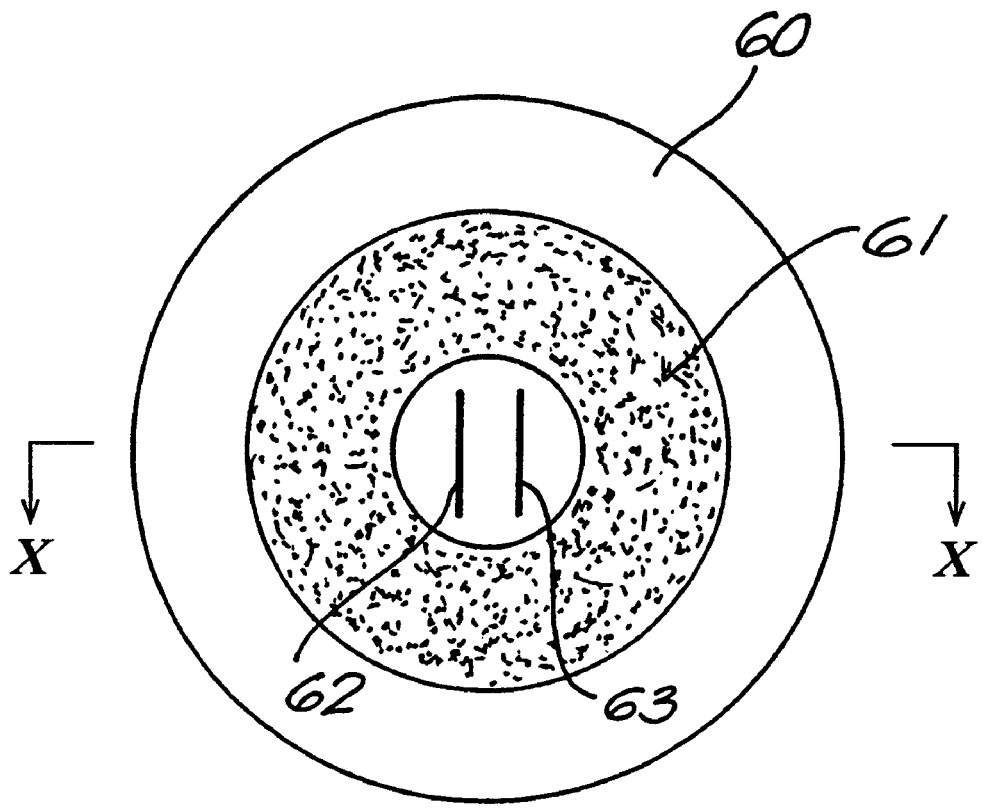
FIG. 9 is a plan view of a patch.
Figure 10:
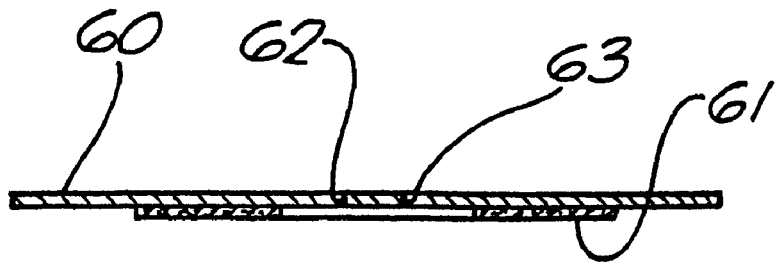
FIG. 10 is a sectional view of a patch along lines x—x in FIG. 9.

Before mounting the housing 11 on to the glass 30, a clear patch of a suitable polymer is fixed over the flaw 31. The patch is indicated at 60 and is shown in more detail in FIGS. 9 and 10. The patch 60 is a circular disc of a suitable polymeric material and carries an annular adhesive band 61 extending under the O-ring 16 when the housing 11 is in position. The patch 60 has a pair of slits 62, 63 to allow gas and liquid to pass therethrough.

Figure 2:
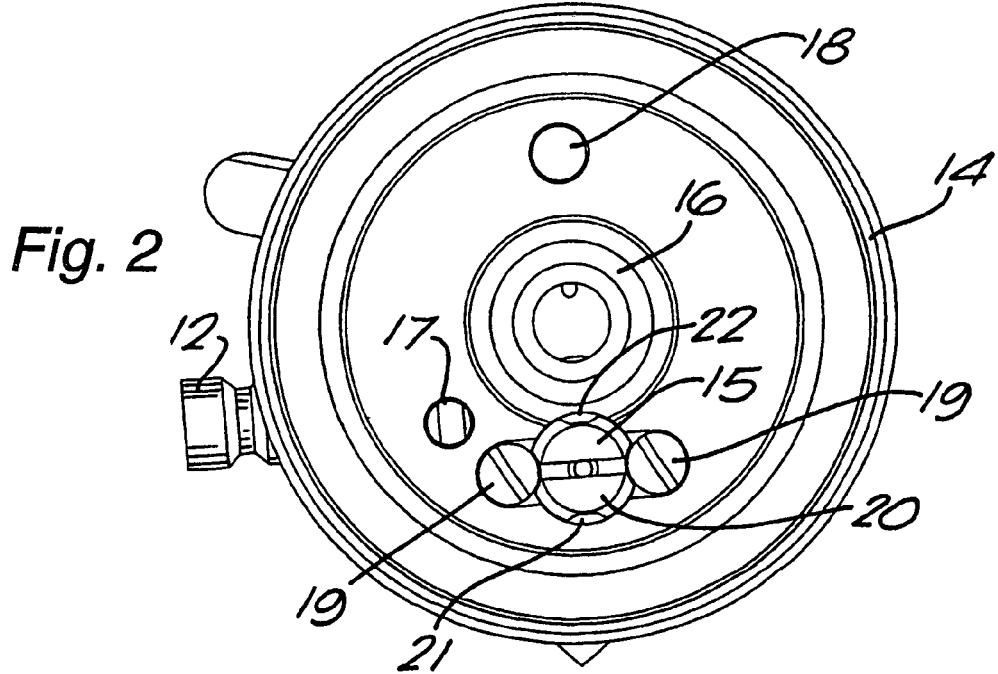
FIG. 2 is an underneath view of the apparatus of FIG. 1.

As can be seen in FIG. 2, the material of the housing 11 inside the O-ring 16 is further away from the glass than the material of the housing outside the O-ring 16. The O-ring 16 together with the glass and the material of the housing 11 defines a repair space 65.

The bore 41 communicates with the repair space 65 through a passageway 70. When the poppet valve 45 is open, there is communication between the repair space 65 and the annular space between the O-ring 16 and the external seal 14. When the poppet valve is closed, the repair space 65 is isolated from the annular space between the O-ring 16 and the external seal 14.

The housing 11 includes a holder 80 for holding a resin capsule 81. The resin capsule 81 is of a suitable plastics material and has a cylindrical portion 82 carrying an O-ring 83 in a circumferential seat. The capsule 81 has a flared opening 84 at one end and an annular flange 85 at the end opposite the opening 84.

The capsule holder 80 in the housing 11 is cylindrical and designed to accept the cylindrical portion of the capsule 85 with the O-ring 83 sealing against the inside of the holder wall 90. The capsule 81 holds liquid repair material 86 retained by a membrane 87. The holder 80 has a central spike 91 located in the material of the housing 11 and sealed with an O-ring 92. When the capsule 81 is inserted into the holder 80 over the spike 91, the spike breaks the membrane to release the resin 86 into the holder 80.

The holder 80 defines an internal space in communication with the repair space 65 through communicating bores 93, 94.

A capsule position locating assembly 100 is mounted on the housing 11 and has a capsule position locating element 101 mounted on a spring 102 such that the element 101 can be pushed in in order to allow the flange 85 of the capsule 81 to pass. Operation of the assembly 100 and movement of the capsule 81 will be described in more detail in connection with the operating sequence, as will movement of the piston 40.

Figure 4:
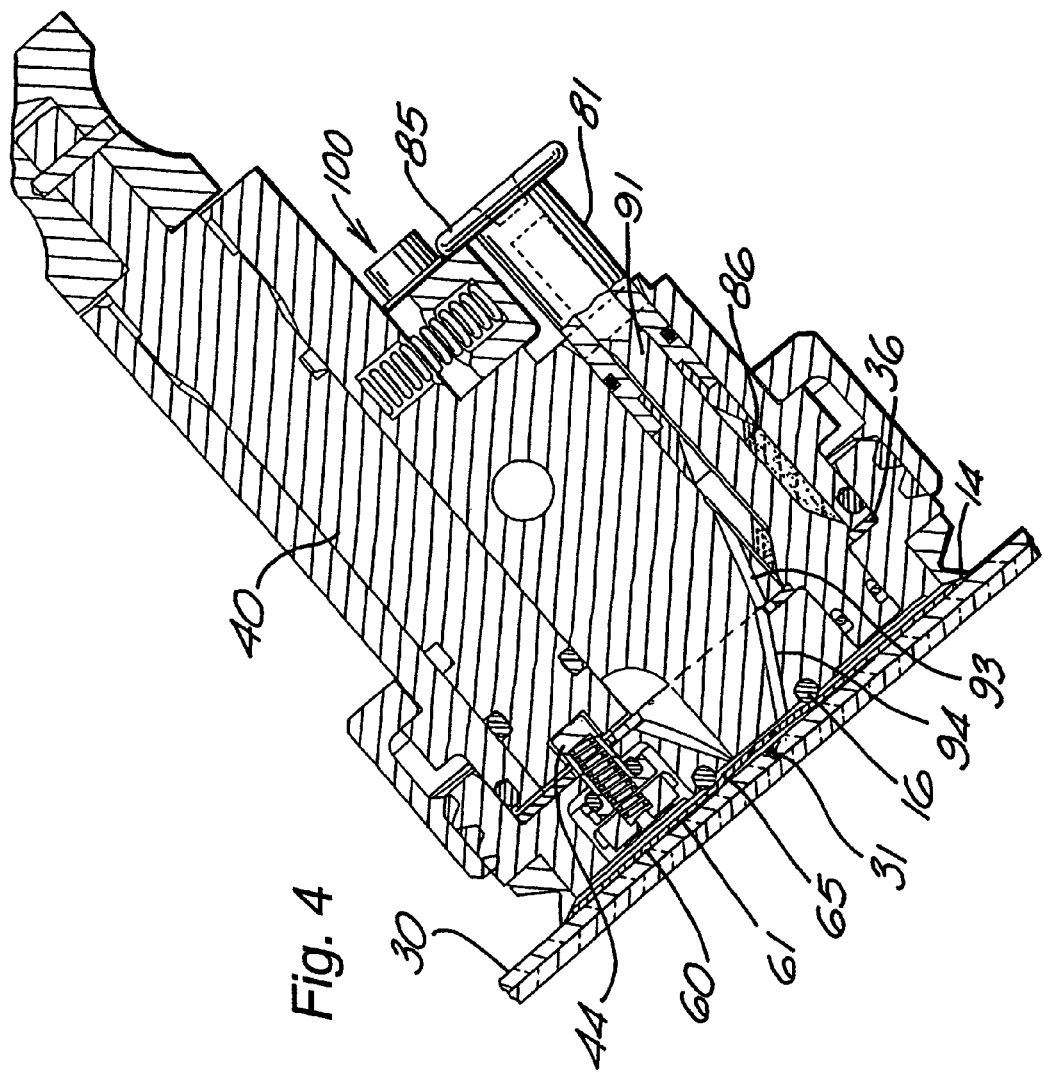
FIG. 4 is a sectional view similar to figure after initial insertion of a capsule containing liquid repair material.

Once the housing is held to the glass 30 over the flaw 31 and the patch 60 by application of a partial vacuum to the annular space between the O-ring 16 and the seal 14, the capsule 81 is inserted into the capsule holder 80 until the capsule flange 85 engages the element 100. During this operation, the spike 91 breaks the membrane 87 to release resin from the capsule into the capsule holder, as shown in FIG. 4. At this stage the piston 40 remains at its lowest position and the poppet valve is open to cause the repair space 65 to be at the same reduced pressure as the annular space between the O-ring 16 and the seal 14. Based on experimental tests, the apparatus should be kept in the state as described above with reference to FIG. 4 for about 1 minute and this will allow degassing of the flaw and partial degassing of the resin 86 in the resin holder 80. It is important to note that the capsule 81 seals against the side of the capsule holder 80 by means of the O-ring 83 and the reduced pressure in the capsule holder 80 is therefore the same as the reduced pressure in the repair space 65.

Figure 5:
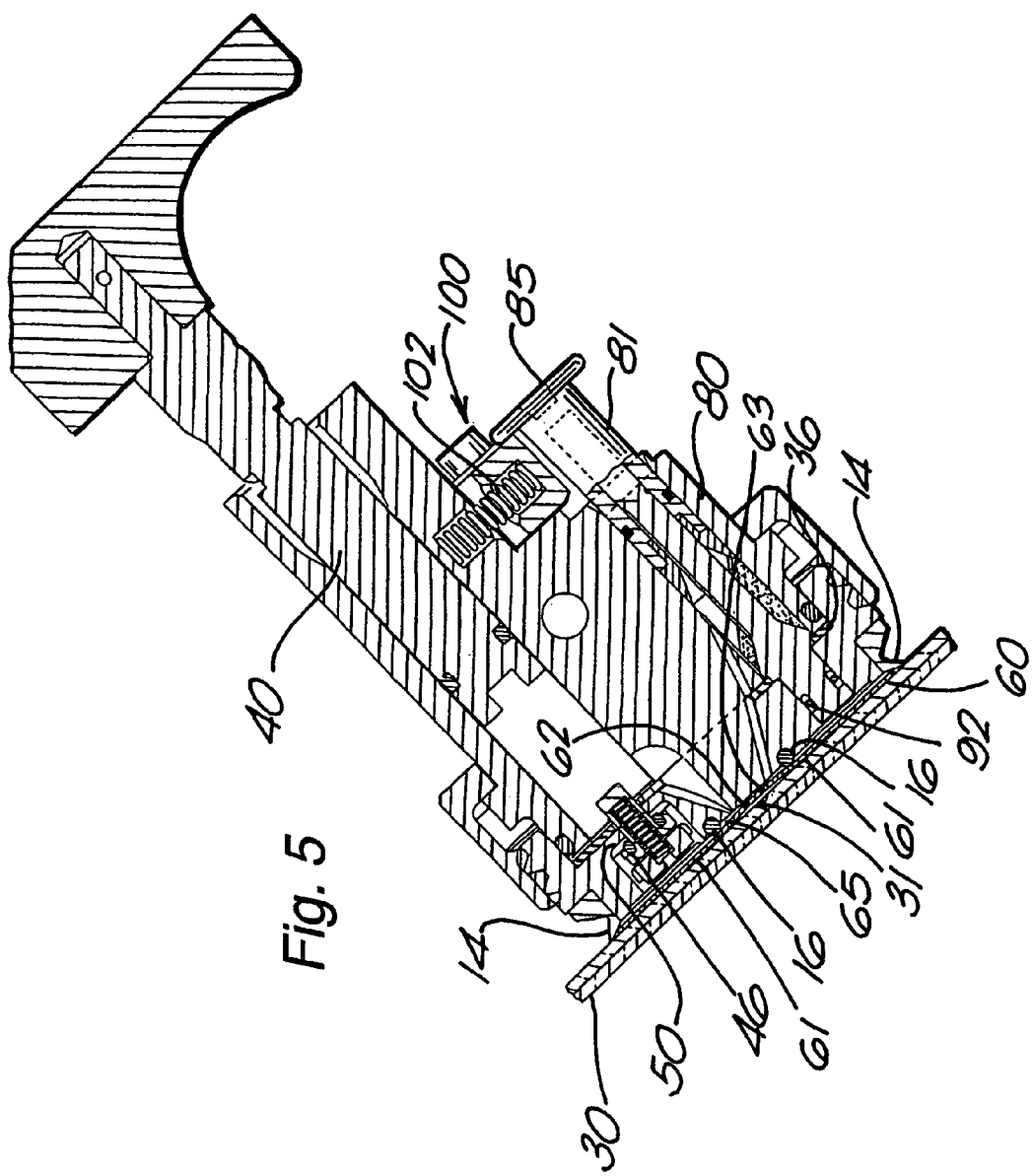
FIG. 5 is a sectional view of the apparatus after creation of an enhanced vacuum.

In order to carry out further degassing (degassing of the flaw should take place in a matter of seconds, but degassing of the resin is a much slower process) the piston 40 is raised, as shown in FIG. 5. Raising of the piston 40 causes closure of the poppet valve such that the poppet valve O-ring 46 seals against the valve seat 50. In this way, the repair space 65 is isolated from the annular space between the O-ring 16 and the seal 14. Raising of the piston 40 significantly enhances evacuation of the repair space 65 and the space at the base of the capsule holder 80. Application of enhanced vacuum by raising the piston 40 should be for about 30 seconds. The piston position shown in FIG. 5 is intermediate its low position and the position for fully enhanced vacuum (the position shown in FIG. 6).

Figure 6:
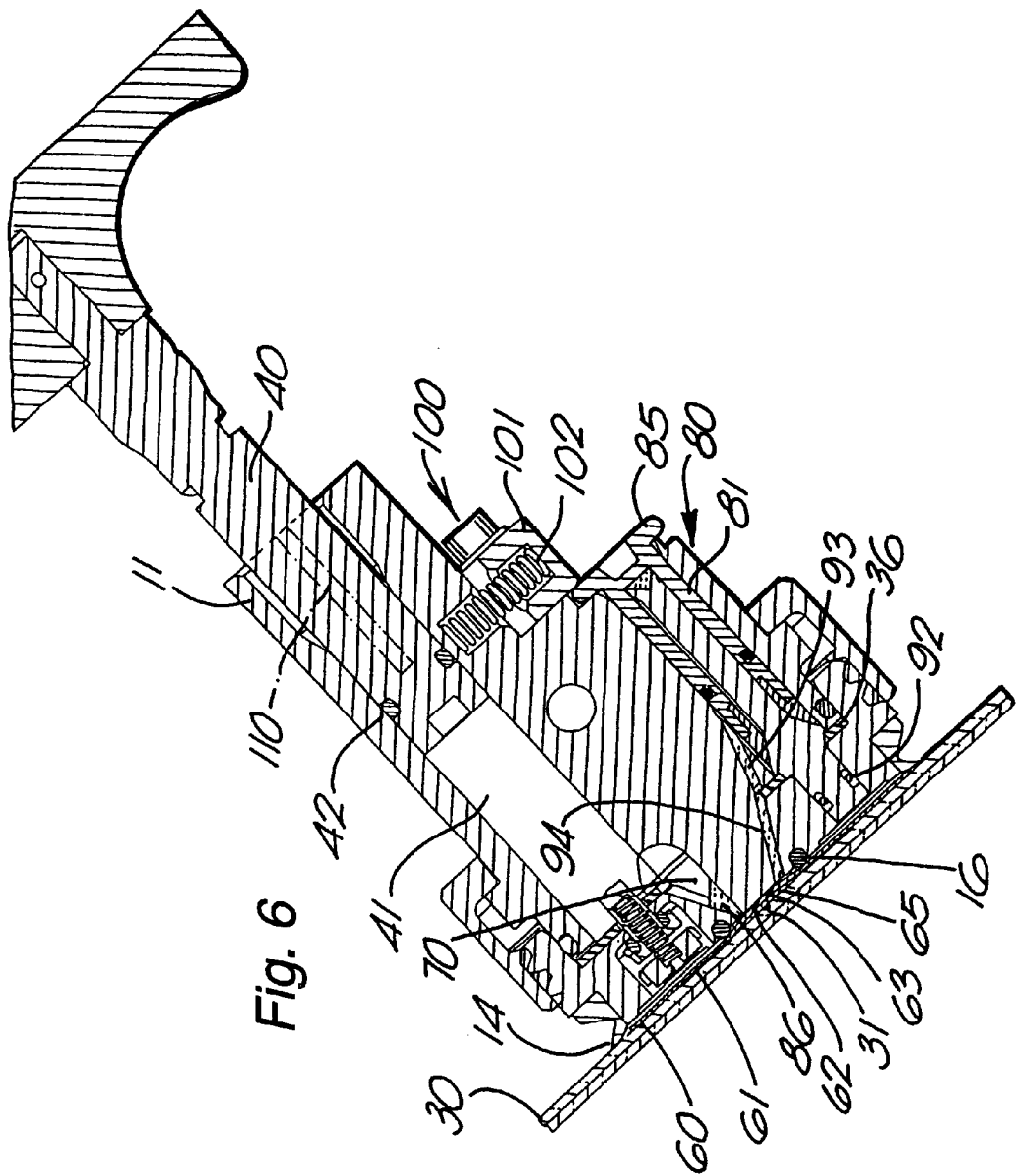
FIG. 6 is a sectional view similar to that of FIG. 5 with liquid repair material introduced above the flaw.

After the piston 40 has been held in the enhanced vacuum position (FIG. 6), the element 101 is pressed in to allow the capsule 81 to be inserted fully into the capsule holder until the element 101 can spring out over the flange 85 (FIG. 6). With the body of the capsule occupying the space in the capsule holder 80, the resin 86 is forced through the bores 93 and 94 to the repair space 65 and into the passage 70 leading to the bore 41. In this way, the repair space 65 is filled with the resin 86, the flaw 31 and the resin 86 having been substantially degassed. Experimentation has shown that it is important to keep the position shown in FIG. 6 for about 30 seconds as it has been observed that the resin stream injected into the repair space 65 often contains many small bubbles, and a few larger ones, in spite of the previous degassing. Video evidence shows that these bubbles float slowly upwards into the overflow space but that it takes approximately 30 seconds to do so.

FIG. 6A shows a modified form of apparatus 10, insofar as retention of the capsule in the reservoir is concerned. The capsule position locating assembly 100 is omitted, and a simpler form of location is provided.

Capsule 81' is internally the same as the capsule 80 of FIG. 6, and lower cylindrical portion of the capsule 80' engages holder 81' in the same way as capsule 80 engages the holder 81 of FIG. 6. However, the capsule 81' has a non-circular flange 85' (in the embodiment shown, of oval shape, although other shapes are possible), in contrast to the circular flange of the capsule 85 of FIG. 6, and the housing 11 has a groove 200 formed therein of dimension to accept and locate the flange 85' when the capsule is twisted to move the wider part of the flange 85' into the groove 200 (as shown in FIG. 6A). When oriented such that the narrower part of the oval flange 85' is adjacent the groove 200, the flange can pass the housing without contact to allow the capsule to slide into or out of the holder 80'.

The insertion steps of the capsule 81' are similar to those described in relation to FIGS. 3 to 6 for the capsule 81. The capsule 81' is first inserted sufficiently into the holder 80' to break the capsule seal 87 and release the resin into the reservoir. Oriented with the wider part of the flange 85' towards the housing 11, the flange 85' engages a shoulder on the housing to locate the capsule 81' in a position similar to that of FIG. 4. Rotation of the capsule 81' such that the narrower part of the flange 85' extends towards the housing 11 allows the capsule to be inserted fully into the holder 80', and twisted again until the wider part of the capsule flange 85' enters the groove and is located thereby to hold the capsule 81' in the fully engaged position (FIG. 6A). The capsule 81' can be withdrawn simply by rotating to disengage the flange 85' from the groove 200 and withdrawing the capsule 81' from the holder 80'.

Figure 7:
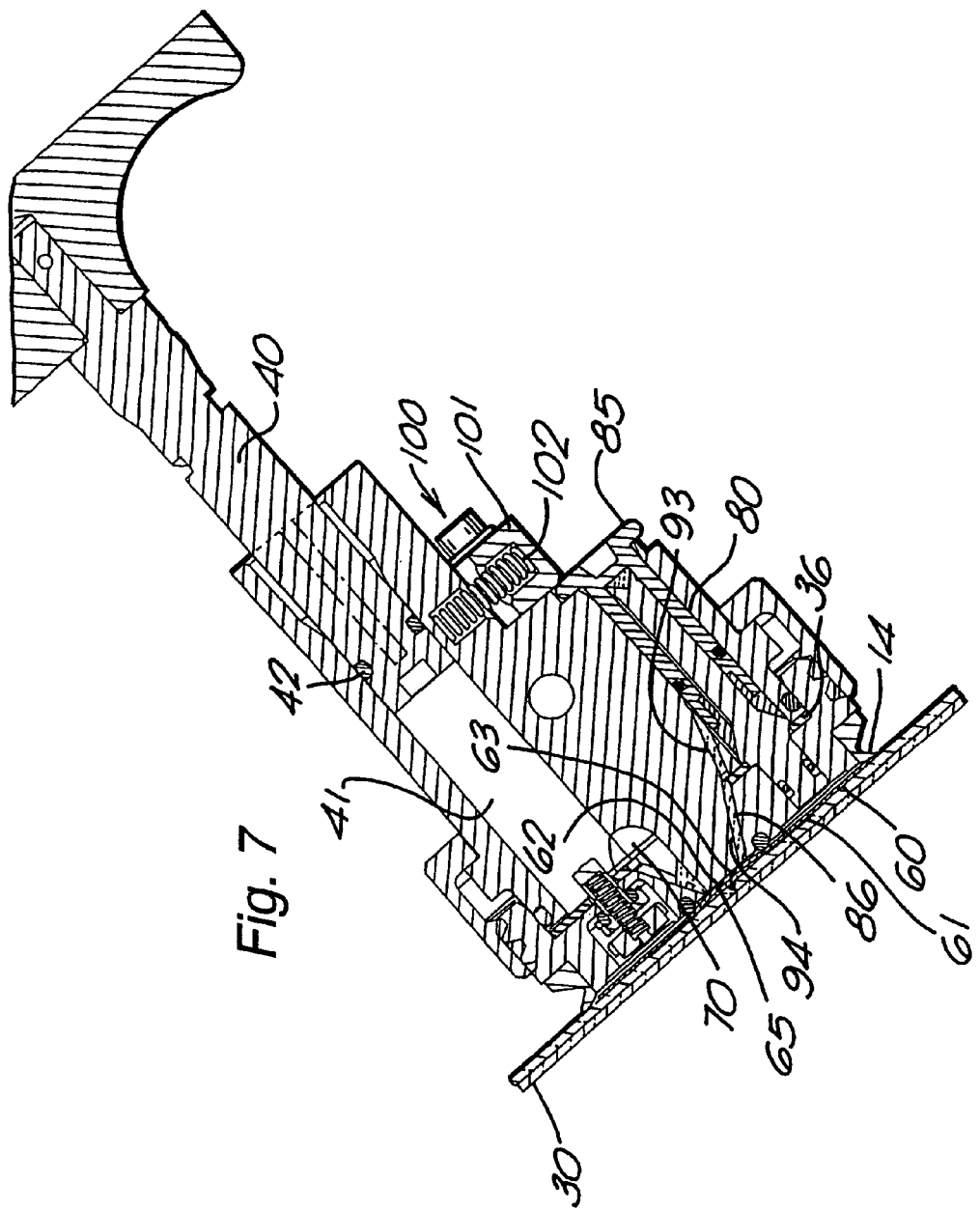
FIG. 7 is a sectional view of the apparatus with the vacuum released.

The next stage is to release the vacuum in the bore 41 by raising further the piston 40 until the O-ring 42 rises above an exhausting groove 110 extending downwardly into the bore 41 from the upper end thereof. The poppet valve remains closed so that the housing 11 remains attached to the glass 30 but the bore 41 and the repair space 65 are returned to atmospheric pressure (FIG. 7).

It is now important to ensure that the resin 86 is filling the entire space of the flaw 31. In order to urge the resin 86 into the flaw 31, the piston 41 is pushed down into the bore 40 once again, causing air in the bore 41 to be compressed and to exert pressure on the repair space 65, thereby ensuring that the flaw 31 is filled with resin. The pressure phase (FIG. 8) requires a significant time to ensure that the flaw 31 is completely filled. While some flaws fill very quickly, others seem to be much slower to fill. Even cracks that seem not to be filling properly sometimes respond to extremely long pressure phase times. For this reason, it is appropriate for the pressure phase to be at least 3 minutes. In the pressure phase, the piston 40 does not engage the poppet valve, which remains closed so that a vacuum is retained in the annular space between the O-ring 16 and the seal 14 while pressure is exerted on the repair space 65.

After completion of the pressure phase, the vacuum pump is turned off to release the vacuum in the annular space between the O-ring 16 and the seal 14 and the apparatus 10 can be removed carefully from the glass 30. At this stage, any excess resin can be wiped away and, if a UV curing resin is used, a UV source can be played on the resin retained in the flaw 31 by the patch 60 until hardened. The patch 60 can then be removed and the hardened resin levelled so that an unblemished surface due to filling of the flaw 31 is produced. The area can then be polished and, with a resin of an appropriate optical characteristic to match that of the glass 30, an effective repair would have been carried out.

Figure 8:
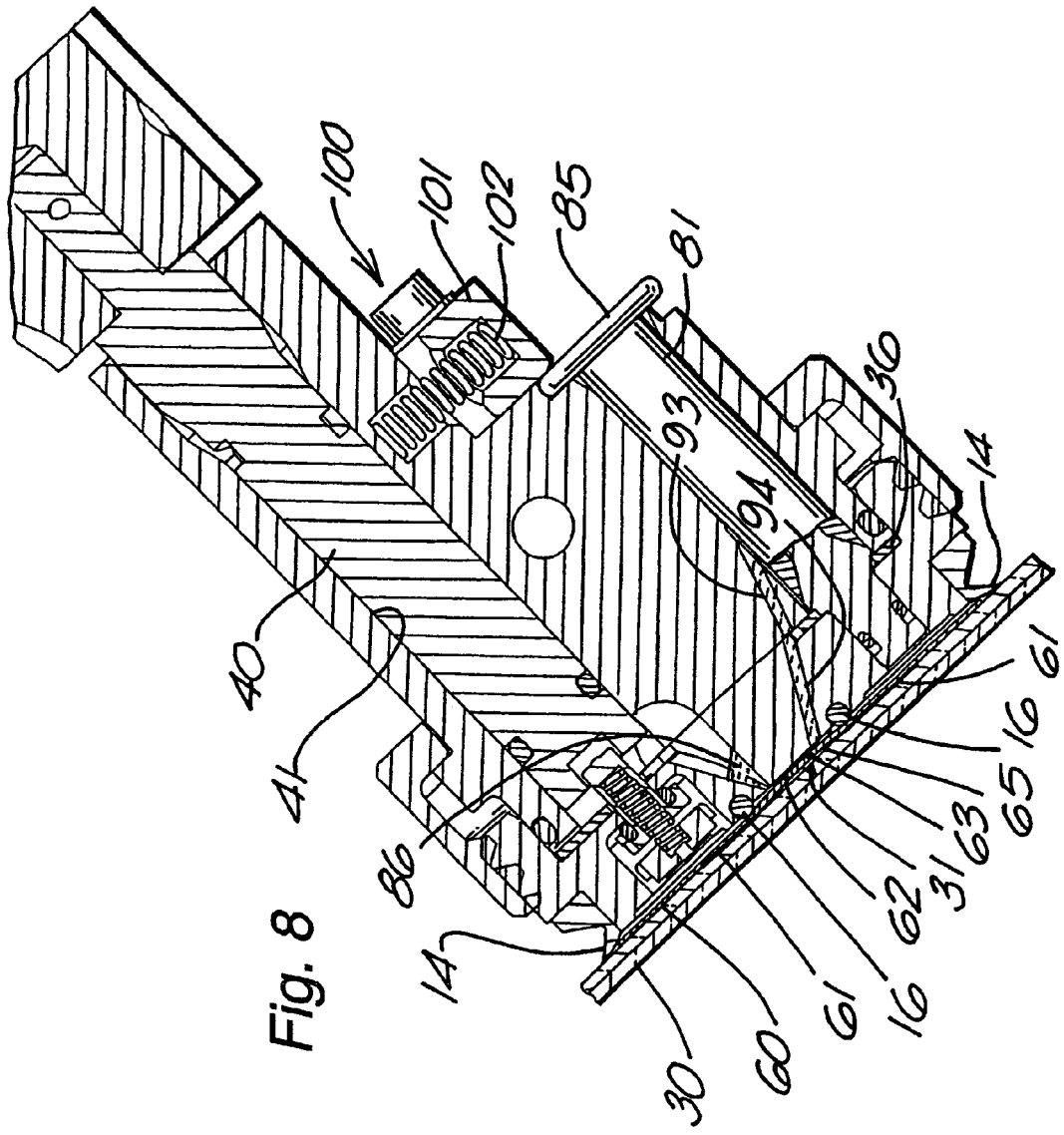
FIG. 8 is a sectional view of the apparatus with pressure applied to liquid repair material.
Figure 11:
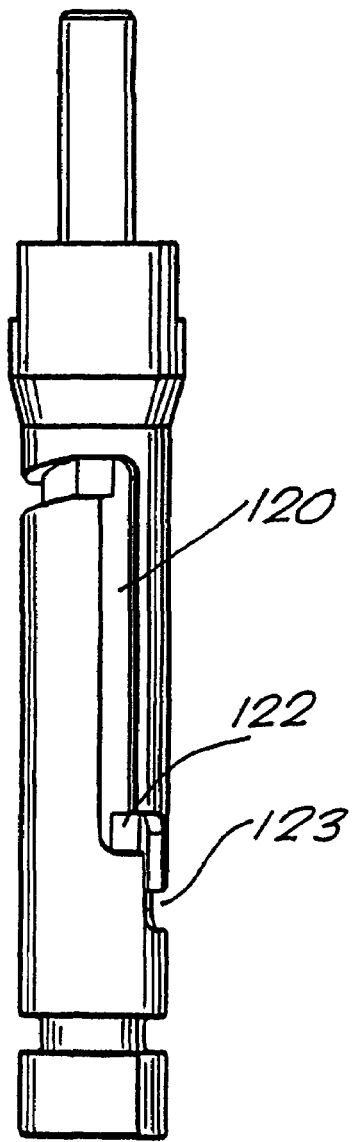
FIG. 11 is a side view illustrating a guide groove in a piston.
Figure 12:
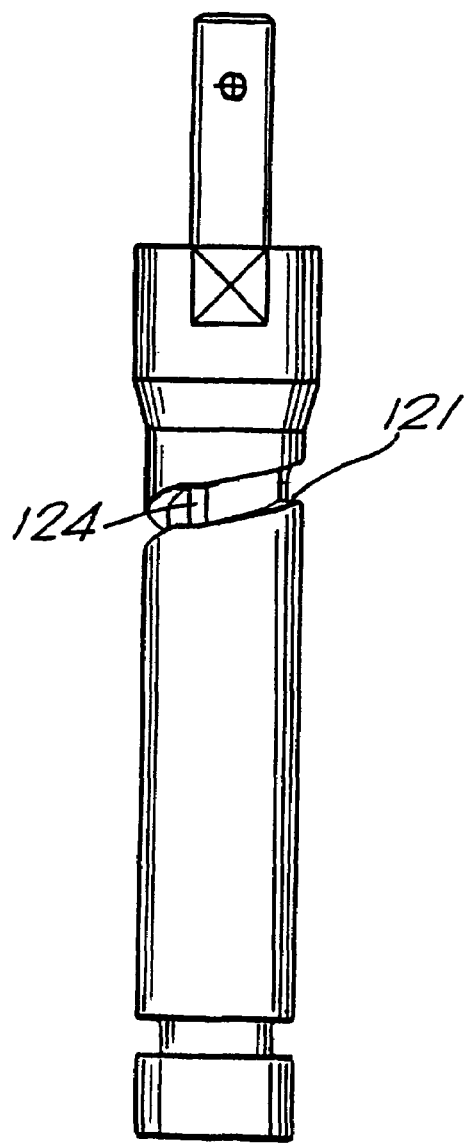
FIG. 12 is a further side view of the piston of FIG. 11.

Positions of the piston 40 in the bore 41 are defined by engagement of a pin (not shown) into the bore 41 from the bore wall with a cam track 120 formed in the piston external surface. FIGS. 11 and 12 show the nature of the cam track 120. The fully inserted position is shown where the pin engages the cam track at 121. The piston is then rotated and pulled out to reach the vacuum enhancing position shown in FIG. 6, when the pin engages circumferential section 122 of the cam track. Vacuum release position (at maximum piston height) is achieved when the pin engages the cam track at 123. The piston is then twisted and returned to a lowered (but not fully lowered) position is shown in FIG. 8 where the pin engages the cam track at 124. To give an operator an audible or tangible indication of a particular position, cam track may have locating positions of increased depth and the pin may be spring loaded to engage the positions of increased depths and thereby indicate to an operator that a particular position has been reached.

This embodiment of a method and apparatus according to the invention provides significant advantages over the existing apparatus and methods, notably that provision of enhanced vacuum improves degassing efficiency, application of enhanced vacuum to both the flaw and resin while the resin is separated from the flaw maximises the opportunity for the flaw to be evacuated properly. This enables substantial reduction in the time required for degassing to take place and a considerable increase in both efficiency and effectiveness of the repair. The system is designed to provide an initial roughing vacuum produced by the vacuum pump of 20 kPa absolute, pressure being reduced during the enhanced vacuum stage to 10 kPa absolute. During the pressure cycle, pressure is increased to 400 kPa absolute (these figures are based on calculations involving the volumes involved and do not allow for possible leakage. The values have not been measured experimentally).

Use of a patch has been found to be particularly effective; previous methods involved application of resin to a flaw and subsequent covering of the resin by a cover strip before curing. The presence of a patch from the start of the operation ensures minimum disturbance to the resin during the operation and during curing.

Use of a resin capsule minimises the risk of contact between the resin and the skin of an operator, as does the use of the patch.

It will be appreciated that modifications to the apparatus and matters may be made, the scope of the invention being defined in the appended claims.

What is claimed is:

1. Apparatus for repairing a flaw in a surface in a repair operation, which apparatus comprises:
   a housing adapted to engage the surface including a housing seal for sealing between the housing and the surface to define a first space,
   a repair seal located on the housing within the first space for sealing throughout the repair operation between the housing and around the flaw to be repaired to define between the surface and the housing a second repair space over the flaw,
   first vacuum means communicating simultaneously with the first space and the second repair space for applying a partial vacuum to the first space and the second repair space after commencement of the repair operation during a first repair stage,
   second vacuum means for applying an enhanced vacuum to the second repair space during a second repair stage, and
   a reservoir for supplying repair liquid to the second repair space.

2. Apparatus as claimed in claim 1, wherein the repair seal is located in a fixed position on the housing.

3. Apparatus as claimed in claim 1, wherein the reservoir communicates with the second repair space, and the first and second vacuum means communicate with the second repair space and the reservoir to apply a partial and an enhanced vacuum respectively to the second repair space and to the reservoir without repair liquid from the reservoir being drawn into the second repair space in order to degas separately the flaw and repair liquid in the reservoir, and means for causing repair liquid, in use, to flow from the reservoir into the second repair space to fill the second repair space with repair liquid.

4. Apparatus as claimed in claim 1, further including means for exerting pressure on the second repair space.

5. Apparatus as claimed in claim 1, wherein at least one of the first or second vacuum means includes a vacuum pump.

6. Apparatus as claimed in claim 1, wherein at least one of the first or second vacuum means includes a piston located in a bore in the housing, the bore in communication with the second repair space such that movement of the piston along the bore increases evacuation of the second repair space.

7. Apparatus as claimed in claim 1, wherein, the first vacuum means includes a vacuum pump and the second vacuum means includes a piston located in a bore in the housing, the bore in communication with the second repair space such that movement of the piston along the bore increases evacuation of the second repair space.

8. Apparatus as claimed in claim 6, wherein the piston is movable between a first position in which the partial vacuum applied by the first vacuum means exists in the second repair space and a second position in which the enhanced vacuum is applied to the second repair space.

9. Apparatus as claimed in claim 8, wherein the piston is movable to a third position in which the bore and second repair space are returned to external pressure, movement of the piston back towards the first position thereby exerting pressure on the second repair space.

10. Apparatus as claimed in claim 8, wherein the piston positions are defined by a cam extending from one of the piston and the bore wall, and a groove in the other of the piston and the bore wall to control piston travel within the bore.

11. Apparatus as claimed in claim 9, wherein the piston positions are defined by a cam extending from one of the piston and the bore wall, and a groove in the other of the piston and the bore wall to control piston travel within the bore.

12. Apparatus as claimed in claim 10, wherein the cam extends from the bore wall and the groove is in the piston external surface.

13. Apparatus as claimed in claim 10, wherein the cam is a pin.

14. Apparatus as claimed in claim 13, wherein the pin is spring loaded.

15. Apparatus as claimed in claim 14, wherein the groove has locating positions of increased depth, the spring loaded pin engaging the positions of increased depth to indicate to an operator that a particular position has been reached.

16. Apparatus as claimed in claim 10, wherein the cam and groove provides for movement by rotating and pulling out the piston to move the piston from the first to the second position in which the enhanced vacuum is applied, further twisting and pulling out causing the piston to reach the third position in which the vacuum is released, twisting and returning the piston, with the cam following the cam track, towards the first position causing pressure to be exerted on the second repair space.

17. Apparatus as claimed in claim 6, further comprising valve means located in the housing between the first vacuum means and the second vacuum means such that when the second vacuum means is in use, the first vacuum means is isolated from the second repair space.

18. Apparatus as claimed in claim 1, wherein the means for causing repair liquid to flow from the reservoir to the second repair space comprises a repair liquid capsule located and movable in the reservoir such that full insertion of the capsule into the reservoir causes the repair liquid to flow out of the reservoir and into the second repair space.

19. Apparatus as claimed in claim 1, wherein the reservoir communicates with the second repair space and the vacuum means communicate with the second repair space and the reservoir to apply a partial vacuum to the second repair space and to the reservoir without repair liquid from the reservoir being drawn into the second repair space in order to degas separately the flaw and repair liquid in the reservoir, and means for causing repair liquid, in use, to flow from the reservoir into the second repair space to fill the second repair space with repair liquid.

* * * * *